(12) United States Patent
Anghel et al.

(10) Patent No.: US 7,990,115 B2
(45) Date of Patent: Aug. 2, 2011

(54) HIGH FREQUENCY GENERATOR WITHOUT ROTATING DIODE RECTIFIER

(75) Inventors: Cristian Anghel, Oro Valley, AZ (US); Ming Xu, Oro Valley, AZ (US); William Scherzinger, Oro Valley, AZ (US)

(73) Assignee: Honeywell International Inc., Morristown, NJ (US)

( * ) Notice: Subject to any disclaimer, the term of this patent is extended or adjusted under 35 U.S.C. 154(b) by 243 days.

(21) Appl. No.: 12/388,388

(22) Filed: Feb. 18, 2009

(65) Prior Publication Data

US 2010/0207590 A1    Aug. 19, 2010

(51) Int. Cl.
*H20P 9/10*    (2006.01)
(52) U.S. Cl. .......................................................... 322/61
(58) Field of Classification Search ..................... 322/61, 322/62, 63, 66
See application file for complete search history.

(56) References Cited

U.S. PATENT DOCUMENTS

| | | | | |
|---|---|---|---|---|
| 4,293,810 A | * | 10/1981 | Wright | 322/28 |
| 5,714,821 A | * | 2/1998 | Dittman | 310/179 |
| 5,783,891 A | * | 7/1998 | Auinger et al. | 310/180 |
| 7,045,986 B2 | * | 5/2006 | Anghel et al. | 318/712 |
| 7,184,927 B2 | * | 2/2007 | Anghel et al. | 318/400.04 |
| 7,514,806 B2 | * | 4/2009 | Xu et al. | 290/31 |
| 2008/0252267 A1 | | 10/2008 | Lando et al. | |

FOREIGN PATENT DOCUMENTS

| | | |
|---|---|---|
| GB | 1240669 A | 7/1971 |
| WO | WO2008 091313 A1 | 7/2008 |

* cited by examiner

*Primary Examiner* — T C Patel
*Assistant Examiner* — Iraj A Mohandesi
(74) *Attorney, Agent, or Firm* — Miriam Jackson, Esq.

(57) ABSTRACT

A high frequency starter-generator system uses an electric machine design that does not employ rotating rectifiers installed on the rotor. The output frequency of such a starter-generator is increased by about 200% as compared with a conventional starter-generator with the same number of poles operating in the same speed range. This design allows significant weight and volume reductions of the electric machine while its reliability is increased. The present invention may find application in any starter-generator application, including more electric architecture-type aircraft designs currently in development.

8 Claims, 13 Drawing Sheets

HIGH FREQUENCY GENERATOR WITHOUT ROTATING DIODE RECTIFIER

BACKGROUND OF THE INVENTION

The present invention relates to a starter-generator system and, more particularly, a high frequency starter-generator system without a rotating diode rectifier installed on the rotor.

Many aircraft include AC generator systems to supply relatively constant frequency or variable frequency AC power. Many of the AC generator systems installed in aircraft include three separate brushless generators, namely, a permanent magnet generator (PMG), an exciter, and a main generator. The PMG includes a rotor having permanent magnets mounted thereon, and a stator having a plurality of windings. When the PMG rotor rotates, the permanent magnets induce AC currents in PMG stator windings. These AC currents are typically fed to a regulator or a control device, which in turn outputs a DC current to the exciter.

The exciter typically includes single-phase (e.g., DC) stator windings and multi-phase (e.g., three-phase) rotor windings. The DC current from the regulator or control device is supplied to exciter stator windings, and as the exciter rotor rotates, three phases of AC current are typically induced in the rotor windings. Rectifier circuits that rotate with the exciter rotor rectify this three-phase AC current, and the resulting DC currents are provided to the main generator field winding installed on the rotor. The main generator additionally includes a rotor and a stator having single-phase (e.g., DC) and multi-phase (e.g., three-phase) windings, respectively. The DC currents from the rectifier circuits are supplied to the rotor windings. Thus, as the main generator rotor rotates, three phases of AC current are induced in main generator stator windings. This three-phase AC current can then be provided to a load such as, for example, electrical aircraft system.

The aircraft industry has been undergoing significant change as a result of advances in the capability of power electronics. Secondary power functions to start main engines and provide power to environmental control systems were previously supplied by high pressure (bleed air) pneumatic systems, and are now being supplied by electric power systems. To supply the additional electric power required for the new functions, the generating and distribution systems have abandoned the traditional fixed frequency power standard in favor of variable frequency or high voltage dc electric systems.

Existing more electric aircraft are based on variable frequency AC systems generally described in industry standards over the range of 360 to 800 Hz. This standard accommodates the typical variation in main engine driven generator frequency and allows the same aircraft bus to operate with a fixed frequency generator, such as typically supplied from the auxiliary power unit (APU). However, this system imposes design constraints on the generating and conversion equipment, since the electromagnetic design is heavily dependent upon the minimum frequency, which leads to weight and volume penalties on the power generation and conversion equipment.

Using higher frequency generators that produce from 800 to 1,600 Hz have been proposed to address this issue. These designs typically use a larger number of poles on the rotors on typical brushless configurations. The AC power is typically rectified and DC power is distributed to the loads.

As can be seen, there is a need for a starter-generator system that can produce a high frequency output while providing weight and cost saving and increased reliability, as compared to prior art designs.

SUMMARY OF THE INVENTION

In one aspect of the present invention, a starter-generator system comprises a main generator having a main generator rotor and a main generator stator; an exciter having an exciter rotor and an exciter stator, the exciter rotor having exciter rotor windings wound thereon; wherein the exciter rotor is configured to provide two-phase AC excitation current to the main generator rotor windings; and wherein the exciter rotor is configured to provide AC excitation current to the main generator rotor windings without passing through a rectifier, wherein a lack of rectifier diodes on the generator rotor results in a frequency addition at the main generator output.

In another aspect of the present invention, a starter-generator system, comprises a main generator having: a main generator stator with a plurality of main stator windings wound thereon; and a main generator rotor disposed at least partially within the main generator stator, the main generator rotor having a plurality of main generator rotor windings wound thereon to receive alternating current, wherein the main generator rotor windings generate an air gap flux when they are electrically excited; an exciter rotor, the exciter rotor having a plurality of exciter rotor windings wound thereon, the exciter rotor windings electrically connected to the main generator rotor windings and configured, upon electrical excitation thereof, to supply electrical AC excitation to the main generator rotor windings without first being rectified through a rotating rectifier; an exciter stator surrounding at least a portion of the exciter rotor, the exciter stator having a plurality of exciter stator windings wound thereon, the exciter stator windings configured, upon electrical excitation thereof, to electrically excite the exciter rotor windings; and at least one rectifier bridge receiving AC power output from a main generator to convert AC power to DC power.

In a further aspect of the present invention, a starter-generator system comprises a main generator having a main generator rotor; and an exciter having an exciter rotor and an exciter stator, the exciter rotor having exciter rotor windings wound thereon, wherein the exciter rotor is configured to provide excitation current to the main generator rotor windings, the excitation current being AC current that has not passed through a rotating rectifier, and wherein the main generator is supplied with AC power and the starter-generator operates as a starter for an engine.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Broadly, the present invention provides a starter-generator system having a high frequency generating and starting system. By using an electric machine design that does not employ rotating rectifiers installed on the rotor, the output frequency of the starter-generator is increased by about 200% as compared with an electric machine with the same number of poles operating in the same speed range. This design allows significant weight and volume reductions of the electric machine while its reliability is increased. The present invention may find application in any starter-generator application, including more electric architecture-type aircraft designs currently in development.

As used herein, the term "high", relative to a "high frequency" refers to a frequency greater than the typical frequency range generated in variable frequency starter-generator systems. This high frequency range typically ranges from about 2,000 to about 4,000 Hz for a generator shaft speed from about 10,000 rpm to about 20,000 rpm.

Figure 1:
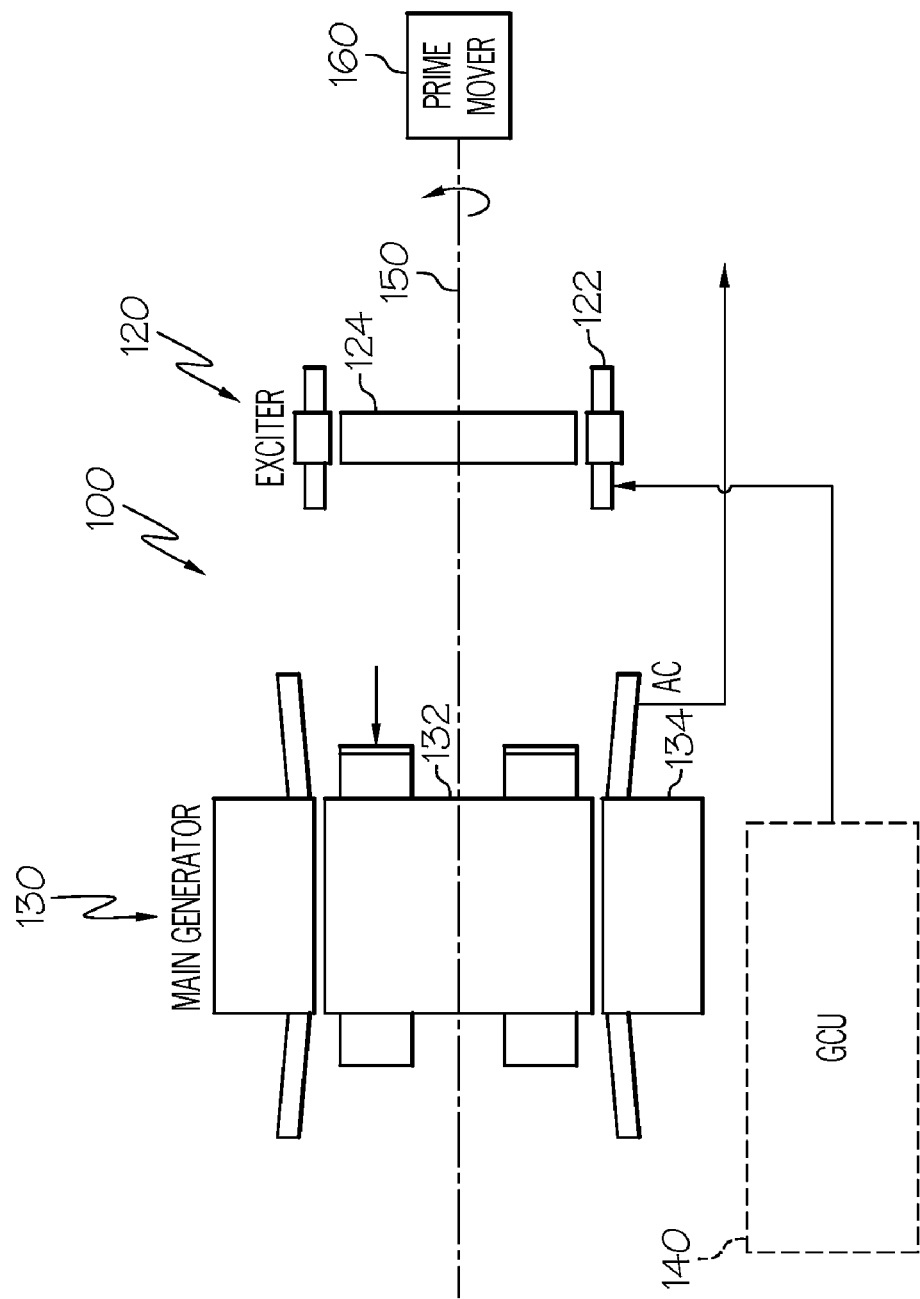
FIG. 1 is a schematic block diagram of an exemplary high frequency starter-generator system according to an embodiment of the present invention.

Referring to FIG. 1, there is shown a schematic block diagram of an exemplary high speed generator system 100 for use with, for example, an aircraft gas turbine engine. This exemplary generator system 100 may include an exciter 120, a main generator 130, and a generator control unit 140. It will be appreciated that the generator system 100 may also include one or more additional components, sensors, or controllers. However, a description of these additional components, sensors, and controllers, if included, is not necessary for a description of the invention, and will therefore not be further depicted or described.

In the depicted embodiment, an exciter rotor 124 of the exciter 120 and a main generator rotor 132 of the main generator 130 may be mounted on a common drive shaft 150. The drive shaft 150 may receive a rotational drive force from a prime mover 160, such as an aircraft gas turbine engine, which may cause the exciter rotor 124 and the main generator rotor 132 to rotate at the same rotational speed. As noted before, the rotational speed of the prime mover 160, and thus these generator system components, may vary. For example, in one embodiment described in more detail below, the rotational speed may vary within a range of about 10,000 rpm to about 20,000 rpm. It will be appreciated that this rotational speed range may be merely exemplary, and that various other speed ranges may be used without departing from the scope of the invention.

Regardless of the specific rotational speed range of the common drive shaft 150, it will be appreciated that the generator control unit 140 may supply power to an exciter stator 122 of the exciter 120. In turn, this may induce the exciter rotor 124 to supply an induced alternating current to the main generator rotor 132. As the main generator rotor 132 rotates, it may induce AC current in a main generator stator 134, which may be, in turn, supplied to one or more loads.

Figure 2A:
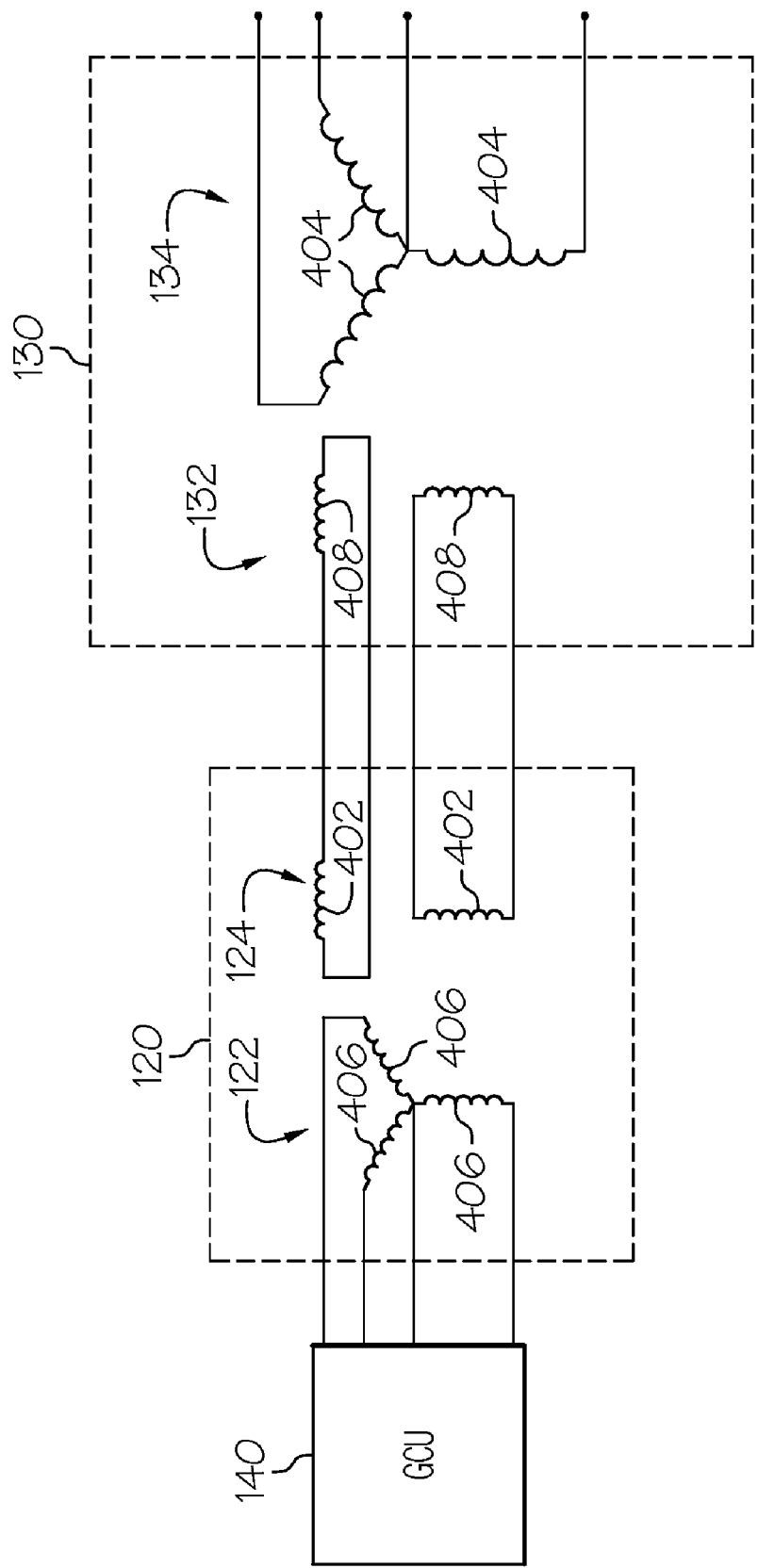
FIG. 2A is a schematic representation of an embodiment of the starter-generator system of FIG. 1.

Referring now to FIG. 2A, it may be seen, for example, that the exciter rotor 124 and the main generator rotor 132 may be configured differently from conventional brushless AC generator systems, and the exciter stator 122 and main generator stator 134 may also be configured differently from conventional brushless AC generator systems. In particular, the exciter rotor 124 and the main generator rotor 132 may be implemented with two phase exciter rotor windings 402 and two phase main rotor windings 408 respectively. These two phase windings may be configured to be shifted by a value in a range of from 80 electrical degrees to 100 electrical degrees in time and in space, with 90 electrical degrees being a typical amount.

Figure 2B:
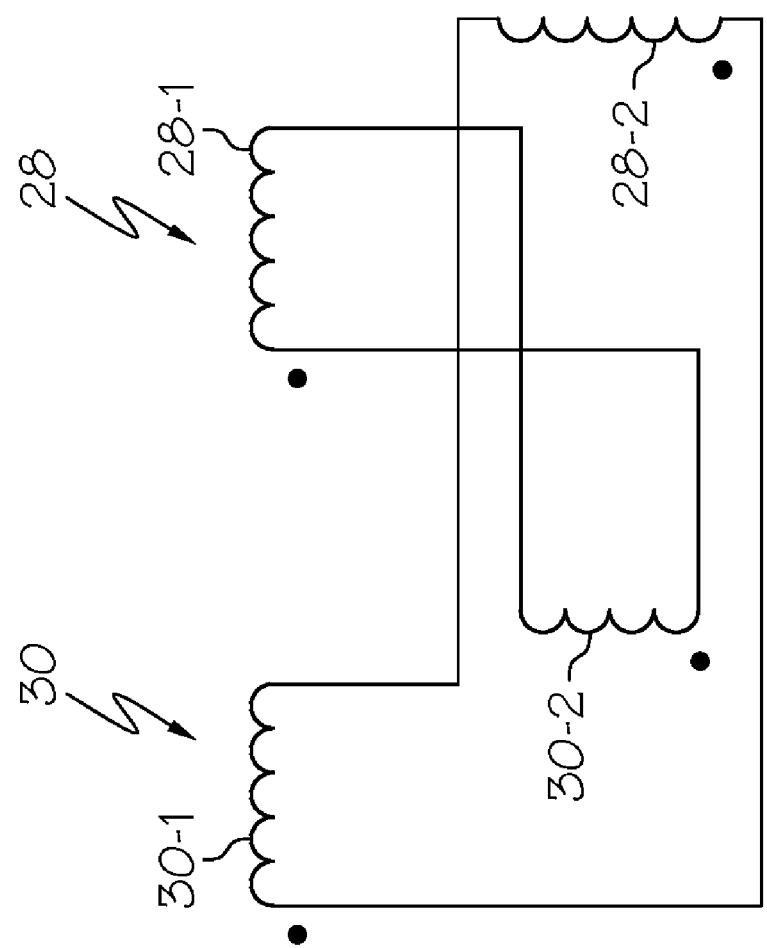
FIG. 2B is a schematic representation of a rotor winding orientation according to an embodiment of the present invention.
Figure 2C:
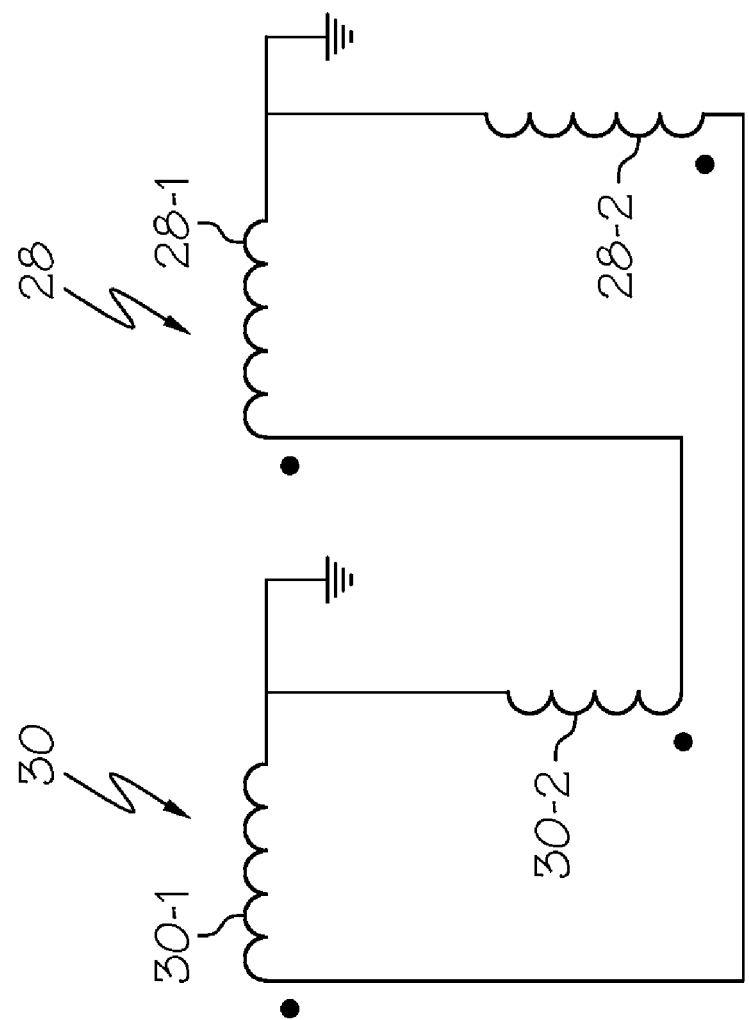
FIG. 2C is a schematic representation of a rotor winding orientation according to an embodiment of the present invention.
Figure 2D:
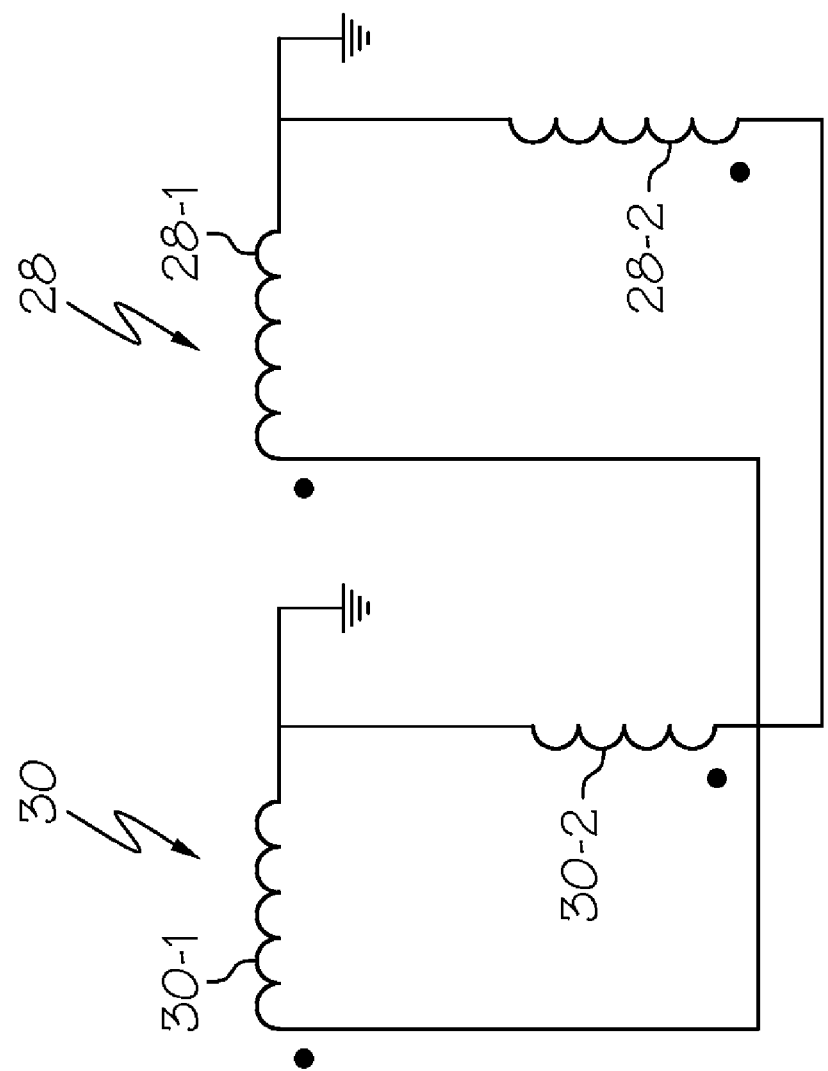
FIG. 2D is a schematic representation of a rotor winding orientation according to an embodiment of the present invention.

Referring now to FIGS. 2B, 2C and 2D, it may be seen that the main rotor windings 30 may comprise a first winding 30-1 and a second winding 30-2. The first and second windings 30-1, 30-2 may be oriented orthogonally to each other. The exciter rotor windings 28 may comprise a first winding 28-1 and a second winding 28-2. The windings 28-1, 28-2 may also be oriented orthogonally to each other. The exciter rotor windings 28 may be electrically interconnected with the main rotor windings 30. Various configurations of interconnections are illustrated in FIG. 2B, FIG. 2C and FIG. 2D. In FIG. 2B and FIG. 2C, inverse interconnections are illustrated. In FIG. 2D, a direct interconnection is illustrated. It has been found that an inverse interconnection as illustrated in FIG. 2B may be particularly effective for one of the systems 100 that may be employed as a starter-generator of an aircraft.

The exciter stator 122 may be implemented with three phase exciter stator windings 406 as shown in FIG. 2A or two phase exciter stator windings 406 as shown in FIGS. 3A, 3B, 3D, 3E and 3F, while the main generator stator 134 may be implemented with standard three phase main stator windings 404. The exciter stator 122 may be implemented with DC exciter stator windings 408 as shown in FIG. 3C. It will be appreciated that the core of the exciter stator 122 can be configured to use either slotted cylindrical poles or salient poles. Another difference from conventional brushless AC generator systems may be that there may be no rotating rectifier assemblies coupled between the exciter rotor 124 and the main rotor 132. Rather, the exciter rotor windings 402 may be directly coupled to the main rotor windings 408.

Figure 3A:
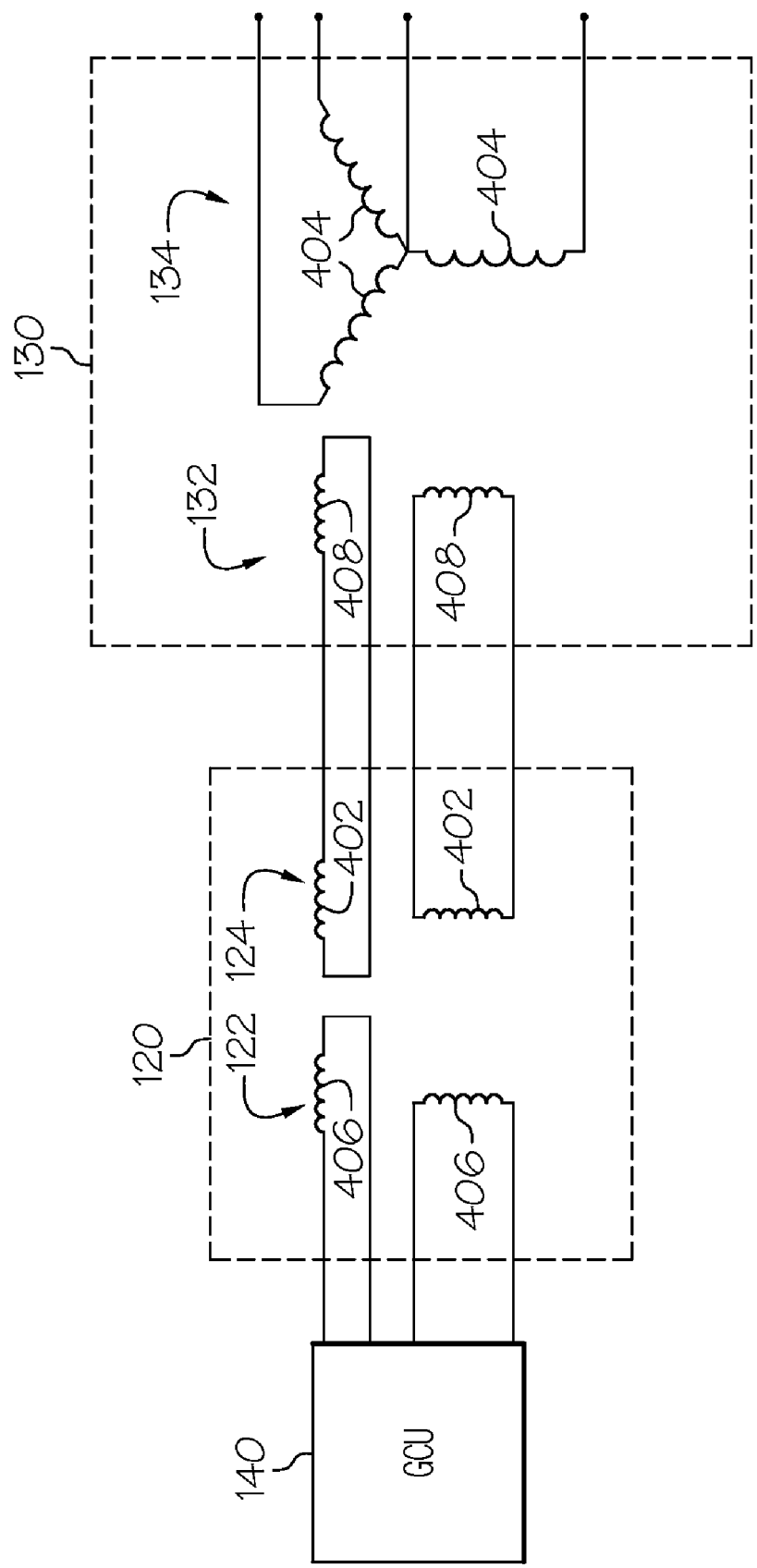
FIG. 3A is a schematic representation of another embodiment of the starter-generator system of FIG. 1.
Figure 3B:
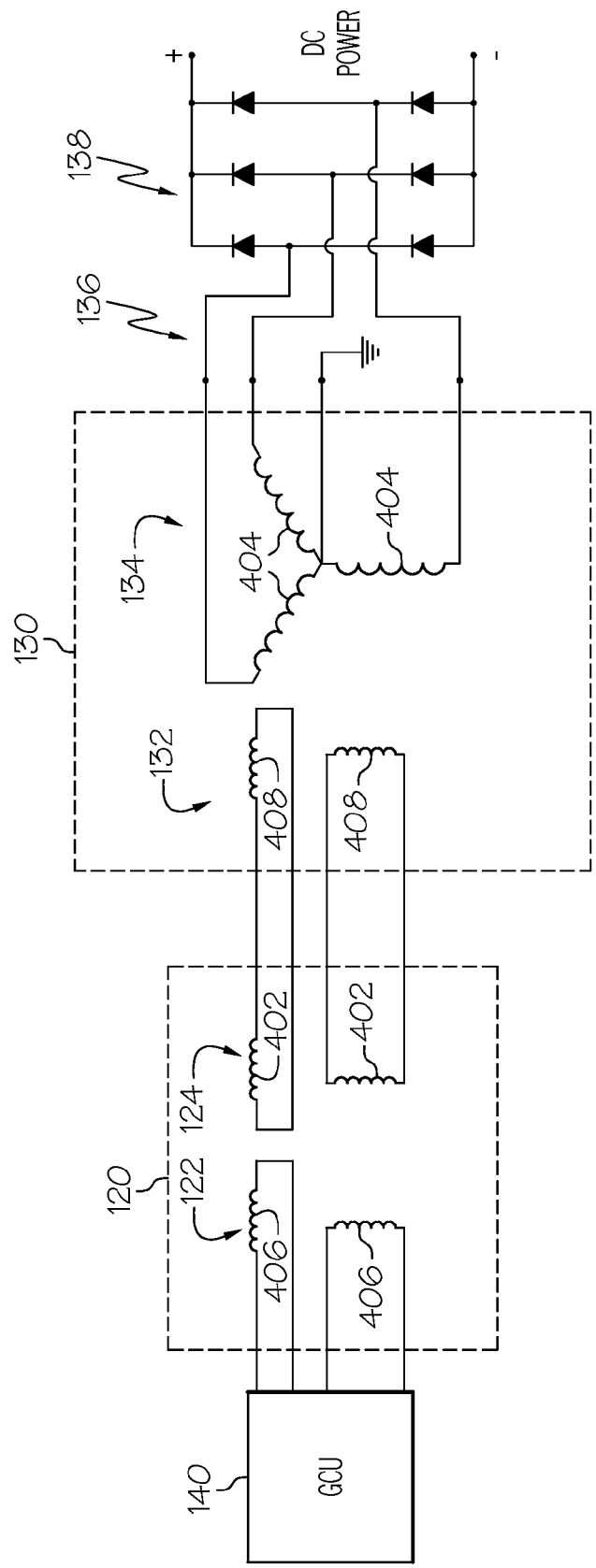
FIG. 3B is a schematic representation of another embodiment of the starter-generator system of FIG. 1 in which the starter generator's output is rectified.
Figure 3C:
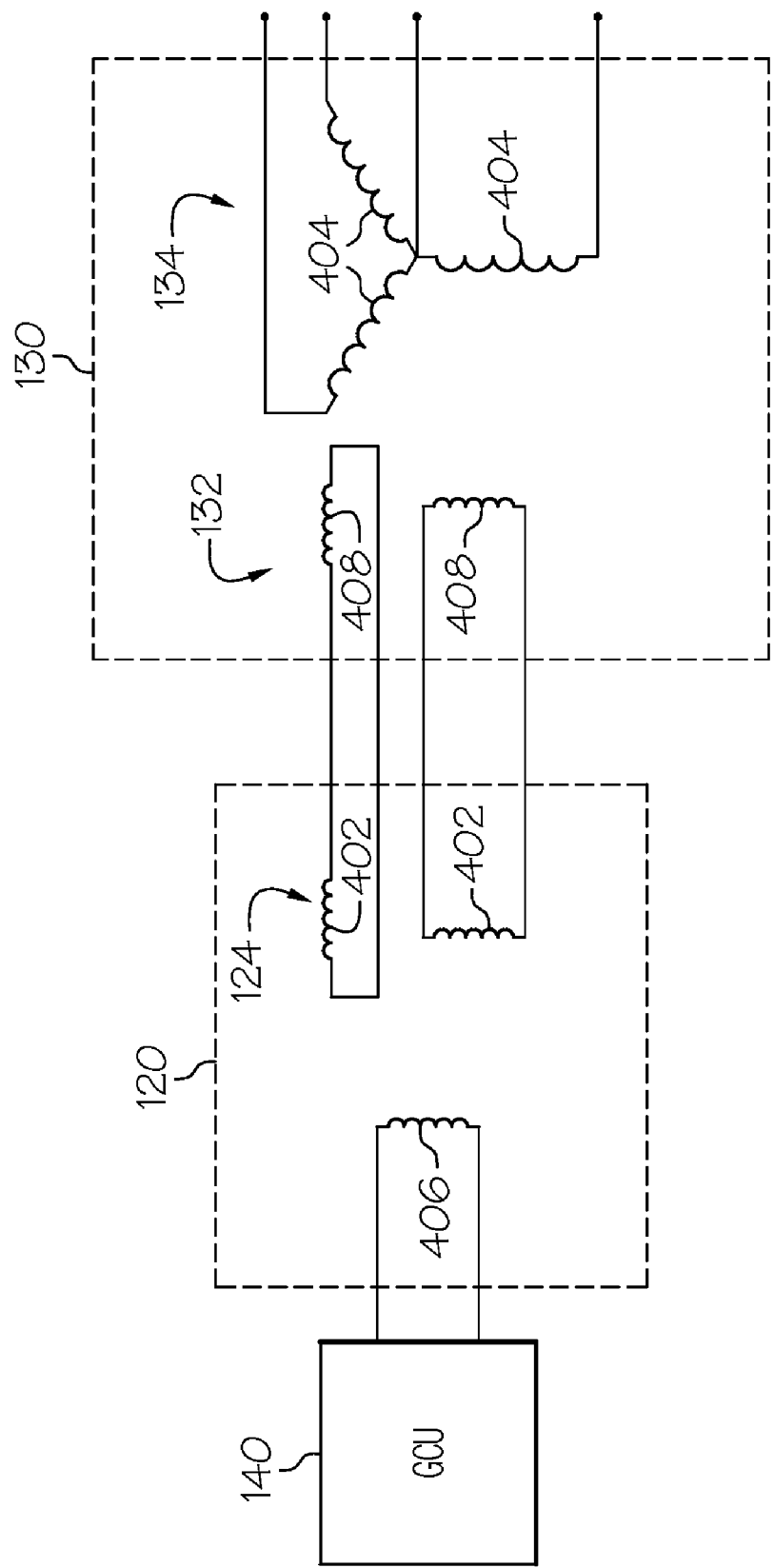
FIG. 3C is a schematic representation of another embodiment of the starter-generator system of FIG. 1 in which the excitation winding is DC

Referring specifically to FIG. 3B, there is shown a schematic representation of another embodiment of the starter-generator system of FIG. 1 in which the starter generator's output 136 may be rectified. One rectifier bridge 138 may be used to convert the high frequency AC output 136 from the main generator stator 134 into DC power. While FIG. 3B shows a three-phase output from the main generator stator 134, the invention should not be considered limited to such an exemplary embodiment. The generator output 136 may be, for example, a six-phase AC output, as shown in FIGS. 3E and 3F, or a nine-phase AC output. In these cases, two or three rectifier bridges, respectively, may be used to convert the AC output into DC power.

Referring now to FIGS. 3E and 3F, there are shown schematic representations of an embodiment of a starter-generator system having a six-phase output, in which the starter generator's output 136 may be rectified. In FIGS. 3E and 3F, the main generator stator is configured to produce a six-phase output that is made of two sets of three-phase outputs. The two sets of three-phase outputs are shifted by 30 degrees with respect to each other. Each of the two sets is connected to a diode bridge 138 and 138' respectively. When multiple rectifier bridges 138, 138' are used, they may be connected either in series (FIG. 3F) or in parallel (FIG. 3E). The rectifier bridges 138, 138' may be installed on the generator 130. In this configuration the rectifier bridges 138, 138' may take advantage of the same coolant fluid as is used for the generator 130. The main generator stator can be configured for three-phase, six-phase output as shown and the drawings or for multiple-phase output such as nine-phase, twelve-phase or other advantageous combination.

Figure 3D:
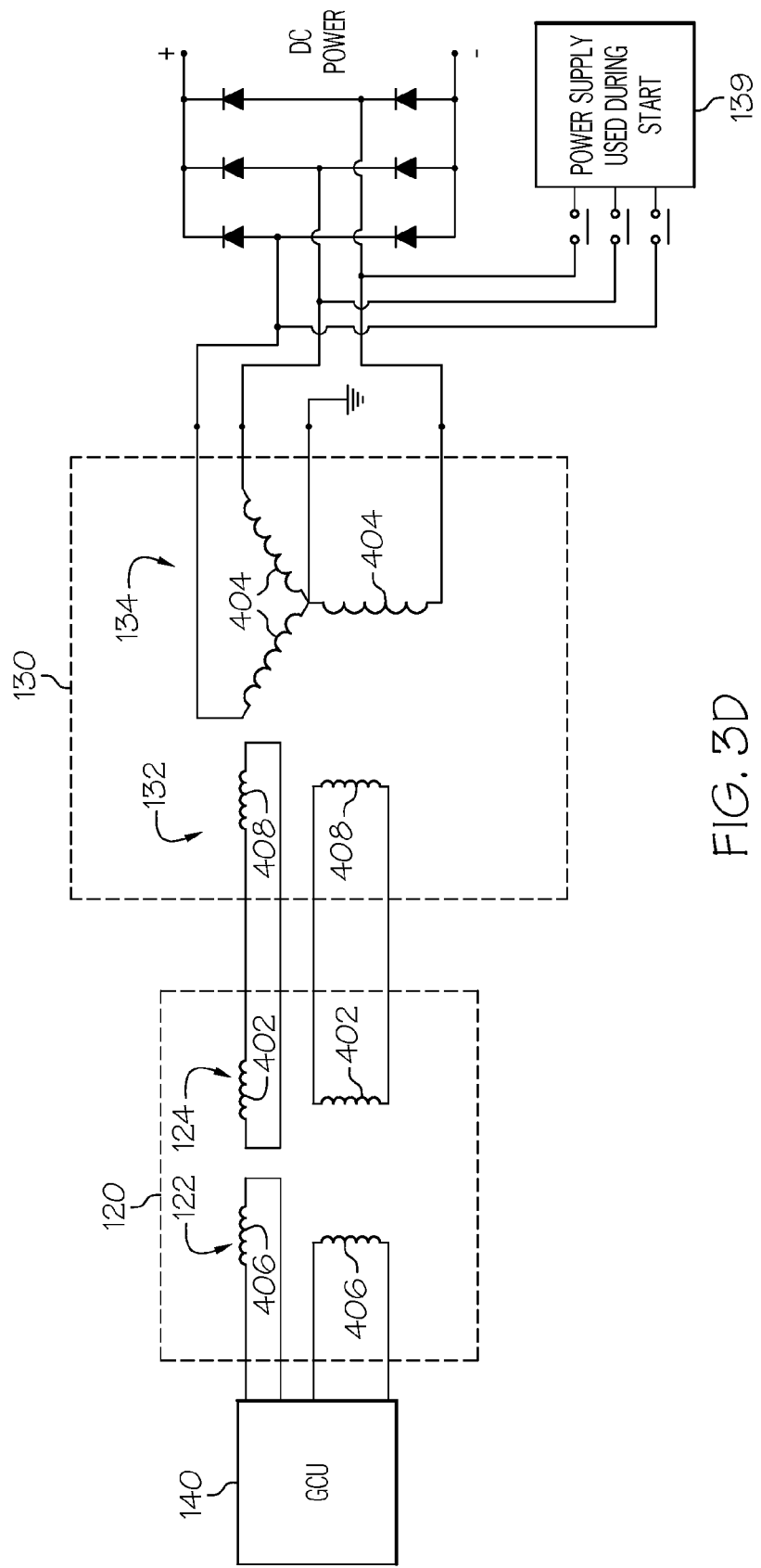
FIG. 3D is a schematic representation of another embodiment of the starter-generator system of FIG. 1 in which the starter generator is used as a starter.
Figure 3E:
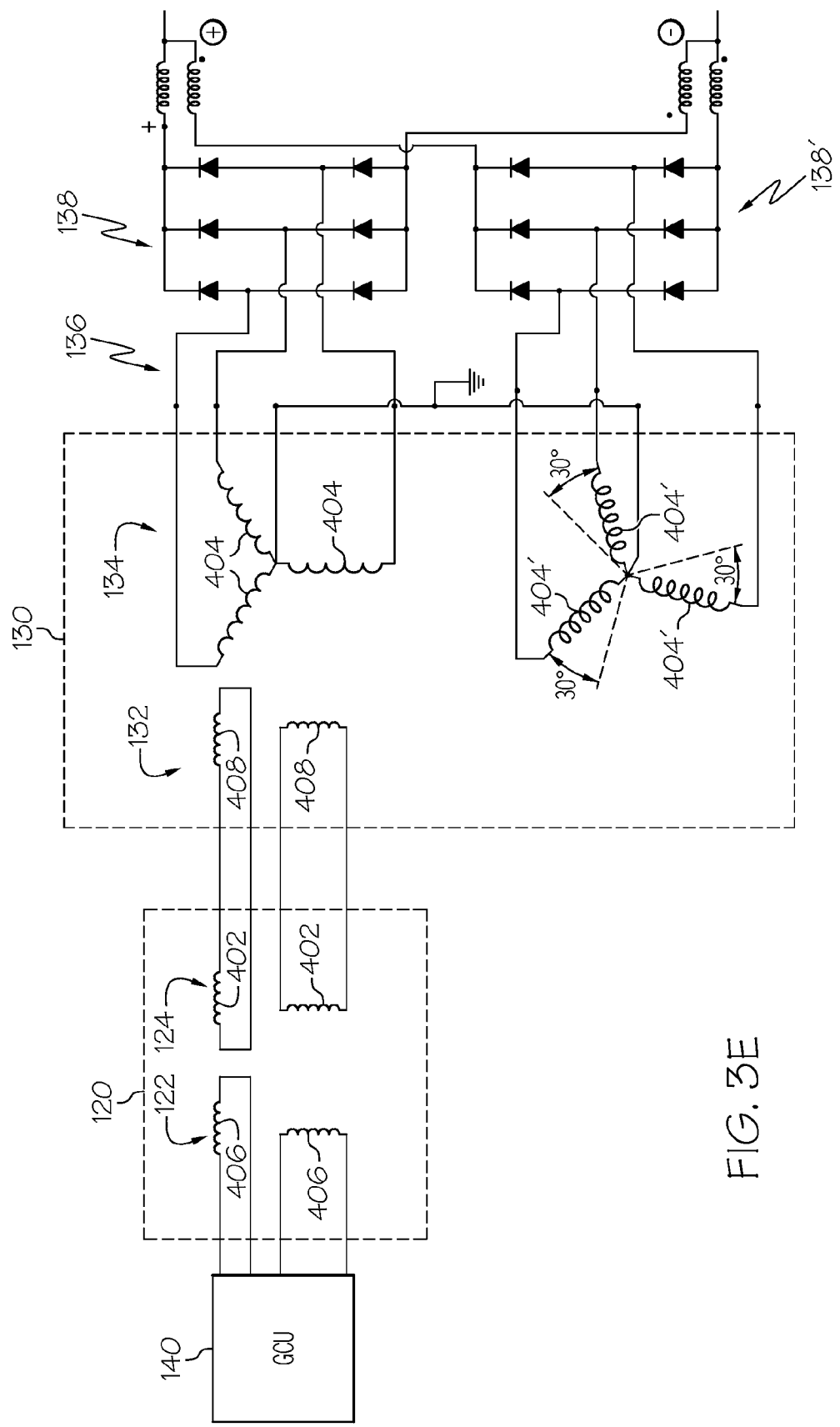
FIG. 3E is a schematic representation of an embodiment of a starter-generator system having a six-phase output in which the starter generator's output is rectified in parallel.
Figure 3F:
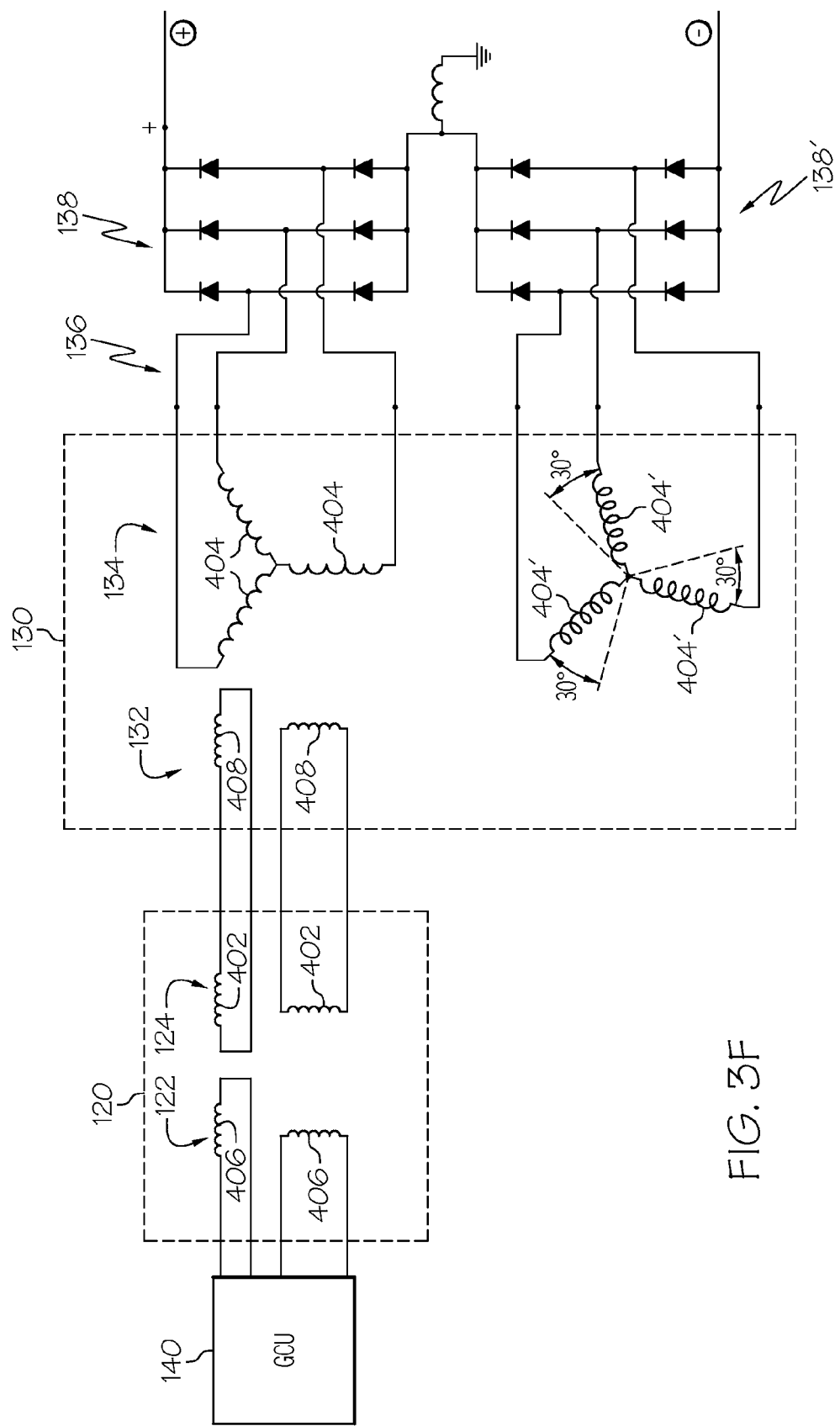
FIG. 3F is a schematic representation of an embodiment of a starter-generator system having a six-phase output in which the starter generator's output is rectified in series.

Referring now to FIG. 3D, there is shown a schematic representation of another embodiment of the starter-generator system of FIG. 1 in which the starter generator may be used as a starter. In this case, the main generator stator 134 may be supplied with AC power from a power supply 139 so that the starter-generator may be used as a starter. As shown in FIG. 3D in some cases during start the GCU provides AC excitation to the exciter stator windings 122.

The general formula for calculating the conventional generator's output frequency with DC excitation may be given as follows:

$$F = NsP/120$$

where F is the frequency produced, Ns is the rotational speed of the drive shaft 150, and P is the number of main generator poles. In the depicted embodiment of FIG. 2A, the prime mover 160 may be configured to rotate the shaft 150 at a rotational speed (Ns) of between about 10,000 rpm and about 20,000 rpm, the exciter 120 may be implemented as a 12-pole exciter and the main generator 130 may be implemented as a 12-pole generator, and the desired output frequency from the generator system 100 may be from about 2,000 to about 4,000 Hz.

When the prime mover 160 is rotating the drive shaft 150 at 10,000 rpm, the 12 pole exciter rotor would generate a characteristic frequency F=(10,000×12)/120 Hz, or 1,000 Hz if the excitation current in the exciter stator winding 406 were DC.

Similarly, a 12-pole, main generator would have a characteristic frequency of 1,000 Hz ((10,000×12)/120)). Since the main generator rotor 132 is excited by a frequency of 1,000 Hz, then the main generator rotor 132 may generate a main generator air gap flux at a frequency of (1,000+1,000) Hz, or 2,000 Hz. Thus, the generator stator 134 may supply AC current at 2,000 Hz.

If the 12-pole main generator rotor 132 were supplied with DC excitation, as in a conventional brushless AC generator, the generated air gap flux at a rotational speed of 10,000 rpm would be 1,000 Hz. However, since the main generator rotor 132 is, by virtue of its connection to the exciter rotor 124, being supplied with AC excitation at a frequency of 1,000 Hz, the resultant main generator air gap flux is instead (1,000+1,000) Hz, or 2,000 Hz.

The general formula for the invented generator's output frequency is:

$$F = (Ns(M+N))/120$$

Where F is the frequency produced, Ns is the rotational speed of the drive shaft 150, and N is the number of main generator poles and M is the number of exciter generator poles.

The exciter generator and the main generator can be of cylindrical or salient construction.

Figure 4:
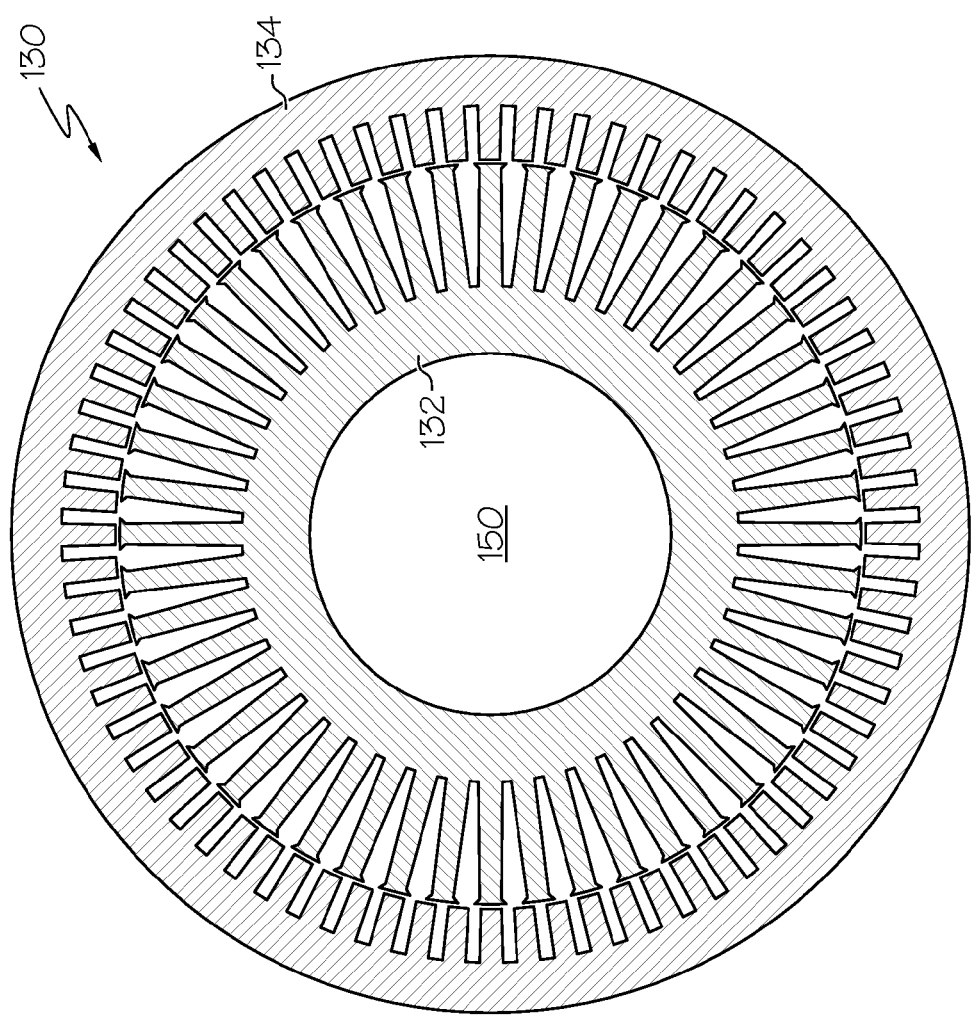
FIG. 4 is a cross-sectional view of a main generator rotor and stator according to an embodiment of the present invention.

Referring to FIG. 4, there is shown a cross-section of the main generator 130, where the particular configuration may include a 12-pole main generator rotor 132 within the main generator stator 134, both of them with cylindrical construction.

Figure 5:
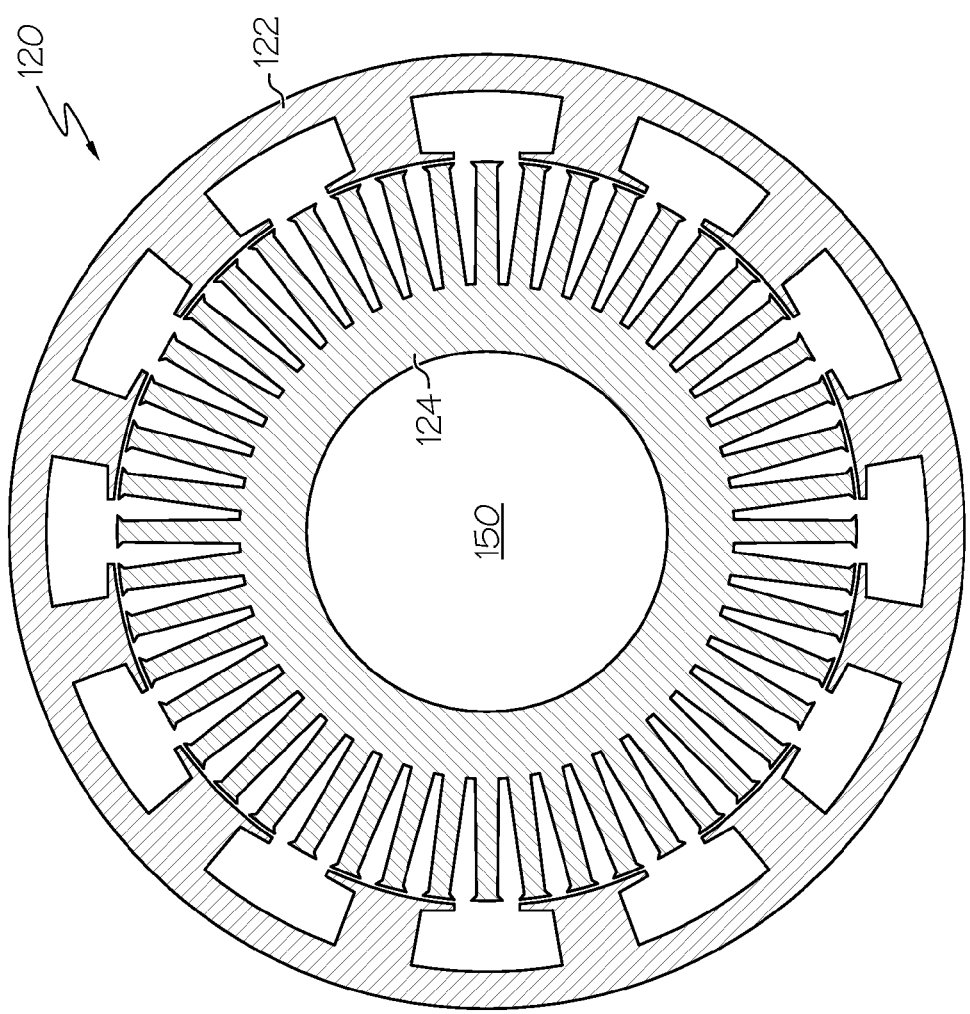
FIG. 5 is a cross-sectional view of an exciter rotor and stator according to an embodiment of the present invention.

Referring to FIG. 5, there is shown a cross-section of the exciter 120, where the particular configuration may include a 12-pole exciter rotor 124 within the exciter stator 122, where the rotor is of cylindrical construction and the stator is of salient construction i.e. each pole may be a salient pole.

While the above description refers to a 12-pole generator and a 12-pole exciter, the present invention is not necessarily meant to be limited to such an exemplary description. For example, a 10-pole generator and a 10-pole exciter may be usable in starter-generator of the present invention, wherein the starter-generator may still generate a variable frequency output between about 2,000 and about 4,000 Hz for a generator shaft speed from about 12,000 rpm to about 24,000 rpm.

Embodiments of the present invention may find further application in starter-generator designs where a lower frequency output is desired (for example, from 800 to 1,600 Hz). In this case, the coupled exciter-generator, as described above, wherein the exciter output is not rectified with rotating diodes, may be used, thereby permitting a smaller and lighter starter-generator system. For example, the 12-pole generator and 12-pole exciter discussed above may be reduced to a 6-pole generator and a 6-pole exciter, using the same rotational speed, to produce an output in the 1,000 to 2,000 Hz range.

It should be understood, of course, that the foregoing relates to exemplary embodiments of the invention and that modifications may be made without departing from the spirit and scope of the invention as set forth in the following claims.

We claim:

1. A starter-generator system comprising:
    a main generator having a main generator rotor and a main generator stator, the main generator rotor including two phase main rotor windings wound thereon;
    an exciter having an exciter rotor and an exciter stator, the exciter rotor having two phase exciter rotor windings wound thereon;
    wherein the two phase exciter rotor windings are configured to provide AC excitation current to the two phase main rotor windings without passing through a rectifier; and
    wherein a lack of rectifier diodes on the generator rotor results in a frequency addition at a generator output; and wherein the main generator produces power having a frequency higher than a generator that contains rectifier diodes and the main generator has the same number of poles as the generator that contains rectifier diodes.

2. The starter-generator system of claim 1, further comprising:
a generator control unit supplying DC electrical excitation to the exciter stator windings when the starter-generator operates in a generation mode.

3. The starter-generator system of claim 1, further comprising:
a generator control unit supplying, as needed, multi-phase AC electrical excitation to the exciter stator windings in a phase sequence that is phase shifted in space and time when the starter-generator is in a start mode.

4. The starter-generator system of claim 3, wherein:
the exciter stator windings are configured to produce a two-phase output shifted in space and time; and
the amount of phase shift is a value within a range of about 80 electrical degrees to about 100 electrical degrees.

5. The starter-generator system of claim 1, wherein:
the main generator rotor is implemented as a N-pole rotor;
the exciter rotor is implemented as a M-pole rotor; and
N and M are each integers greater than one.

6. The starter-generator system of claim 5, wherein N and M are 12.

7. The starter-generator system of claim 1, wherein the main generator produces current having a frequency from about 2,000 to about 4,000 Hz for a generator shaft speed from about 10,000 rpm to about 20,000 rpm.

8. The starter-generator system of claim 1, wherein the main generator rotor windings are oriented orthogonally to one another and wherein the exciter are oriented orthogonally to one another.

* * * * *